(12) United States Patent
Wallman et al.

(10) Patent No.: US 7,575,273 B2
(45) Date of Patent: Aug. 18, 2009

(54) BONNET BUMPSTOP FOR A VEHICLE

(75) Inventors: Mattias Wallman, Varberg (SE); Lennart Olsson, Lerum (SE); Anders Fredriksson, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 11/731,959

(22) Filed: Apr. 2, 2007

(65) Prior Publication Data
US 2007/0236048 A1      Oct. 11, 2007

(30) Foreign Application Priority Data
Apr. 4, 2006   (EP)   ................... 06112205

(51) Int. Cl.
*B62D 25/10*   (2006.01)
(52) U.S. Cl. .................. 296/193.11; 296/187.04; 180/69.21; 180/274
(58) Field of Classification Search ............ 296/187.04, 296/193.11; 180/69.21, 69.2, 274
See application file for complete search history.

(56) References Cited

U.S. PATENT DOCUMENTS

| | | | | |
|---|---|---|---|---|
| 5,385,212 | A | | 1/1995 | Cady ................. 180/69.21 |
| 6,237,992 | B1 | * | 5/2001 | Howard ................. 296/187.04 |
| 6,547,316 | B2 | * | 4/2003 | Chung ................. 296/187.03 |
| 6,554,093 | B2 | * | 4/2003 | Sasaki et al. ................. 180/274 |
| 6,612,644 | B2 | * | 9/2003 | Ahn ................. 296/187.04 |
| 6,676,197 | B2 | * | 1/2004 | Ozawa ................. 296/187.03 |
| 6,767,052 | B2 | * | 7/2004 | Kubota ................. 296/203.02 |
| 6,817,435 | B2 | * | 11/2004 | Takeuchi ................. 180/274 |
| 6,824,199 | B2 | * | 11/2004 | Weik et al. ................. 296/187.04 |
| 2004/0251716 | A1 | * | 12/2004 | Choi et al. ................. 296/187.03 |
| 2006/0151221 | A1 | * | 7/2006 | Kalliske et al. ................. 180/69.2 |
| 2006/0213709 | A1 | * | 9/2006 | Yamaguchi et al. ................. 180/69.21 |
| 2006/0237998 | A1 | * | 10/2006 | Andre et al. ................. 296/193.11 |
| 2007/0235237 | A1 | * | 10/2007 | Wallman et al. ................. 180/69.2 |
| 2008/0302591 | A1 | * | 12/2008 | Herzog et al. ................. 180/274 |

* cited by examiner

*Primary Examiner*—Dennis H Pedder
(74) *Attorney, Agent, or Firm*—Gregory Brown; Miller Law Group, PLLC

(57) ABSTRACT

A bonnet bumpstop for use on an automotive vehicle is formed with a first component having a support part for supporting a bonnet on the vehicle in the vertical direction during normal operation when the bonnet is closed against the automotive frame, a second component attachable to the vehicle frame, and a member interconnecting the first and second components to each other. When the bonnet bumpstop incurs a force greater than a predetermined value, such as a force transmitted from a bonnet to the bonnet bumpstop, the bonnet bumpstop is collapsible by substantially instantaneous neutralizing of the interconnection between the first component and the second component. At least a part of the first component, including said support part, is then freed to be move relative to the second component so as to allow the bonnet to move downwardly in case of an impact between an object and the bonnet.

14 Claims, 4 Drawing Sheets

BONNET BUMPSTOP FOR A VEHICLE

FIELD OF THE INVENTION

The invention relates to a bumpstop for a bonnet on the front end of an automotive vehicle, and, more particularly, to a mechanism associated with the bumpstop to allow the yielding of the bumpstop to allow the bonnet to move downwardly when incurring an impact.

BACKGROUND OF THE INVENTION

Motor vehicle manufacturers are constantly striving to provide vehicles which, in the event of a collision, reduce the risk of injury to persons involved in the collision. These persons may be occupants of the vehicle or a pedestrian which is struck by the vehicle. To this end, vehicles are nowadays designed with so-called deformation zones which deform in a controlled manner to thereby absorb energy which arises during impact between the vehicle and an object. The amount of energy which arises in a collision is proportional to the square of the relative velocity between the vehicle and the object at impact. Accordingly, the risk of injury to occupants of vehicles is increased at higher speeds. Due to the considerable amounts of energy which arise as a result of high speed collisions, the deformation zones must exhibit a certain degree of stiffness, or resistance to deformation, to function effectively at those high speeds.

Most collisions between vehicles and pedestrians occur in built-up or urban areas in which the speed of the vehicles is relatively low. For example, most jurisdictions impose a speed limit in urban areas of about 50 km/h. In most collisions, the speed of the vehicle is lower than 40 km/h. Due to the relatively light weight of most pedestrians, the amount of energy arising from a low speed collision between a vehicle and a pedestrian is relatively low. In such situations, the deformation zones of the vehicle may not deform to any great extent and, therefore, a large amount of the energy is transmitted to the pedestrian, possibly resulting in injury.

In addition, a vehicle has certain critical positions that are involved during a collision between a pedestrian and a vehicle. During such a collision between a vehicle and a pedestrian, the pedestrian typically initially impacts the front of the vehicle and, thereafter, the bonnet of the vehicle. Although the bonnet itself may be designed to be relatively deformable, the engine covered by the bonnet is normally not deformable. As a result, the deformation capability of the bonnet is dependent on the size of the clearance between the bonnet and the engine. Several attempts have been made to reduce the head injuries of a pedestrian by certain configurations of the vehicle bonnet, including different configuration that cause the trailing edge of the bonnet to lift. For example, U.S. Pat. No. 5,385,212, granted on Jan. 31, 1995, to John Cady, et al., discloses a vehicle bonnet for motor cars where the vehicle bonnet is lifted to provide a clearance, so that the bonnet may deform to cushion the impact. Such a clearance can be obtained by arranging the bonnet assembly to move rearwardly and pivot when an impact is applied to the leading edge of the bonnet. Such a bonnet is, however, not able to effectively protect a pedestrian in all kind of impact situations. In particular, in a collision between a child and a vehicle the head of the child hits the bonnet at a position much closer to the leading edge of the bonnet.

SUMMARY OF THE INVENTION

A vehicle is usually provided with some kind of bonnet bumpstop for supporting the bonnet and for alignment of the bonnet relative to the vehicle body when the bonnet is closed. In case the hinge mechanism of the bonnet is arranged in the trailing end of the bonnet close to the windscreen of the vehicle, bonnet bumpstops will be arranged in positions close to the leading end of the bonnet. These bumpstops supporting the bonnet in the vertical direction are not able to yield to any great extent, or in other words; a bonnet bumpstop has normally a relatively high resistance to deformation. The possibility to displace such a bumpstop in the vertical direction is very limited. This implies that the deformation capability of the bonnet is strongly reduced in the area close to such a bonnet bumpstop. In most cases the mass-moment of inertia of the bonnet, and the force exerted by any other component supporting the bonnet, creates a sufficient resistance against movement of the bonnet to cushion the impact. Any additional resistance from the bonnet bumpstop could increase the risk of injury to the pedestrian.

The invention is based on the insight that a bonnet bumpstop is potentially dangerous to a pedestrian being hit by a vehicle, in particular to a child since the head of the child can impact the region of the bonnet where such a bonnet bumpstop is arranged.

It is an object of this invention to provide a bonnet bumpstop for an automotive vehicle that will reduce to a substantial extent the risk of injury to a pedestrian during an impact between the pedestrian and a vehicle.

It is a feature of this invention that the bonnet bumpstop is mounted on a first and second members that are arranged to allow a relative movement between the first and second components that permit the bumpstop to be moved downwardly in case of an impact.

It is another feature of this invention that the first component has first and second portions incorporating a weakened portion arranged to permit a relative pivoting of the first and second portions when the first portion encounters a predetermined load.

It is still another feature of this invention that the downwardly movable bumpstop allows the downward movement of the bonnet upon incurring an impact.

It is an advantage of this invention that the bumpstop moves downwardly when the bonnet is impacted.

It is another advantage of this invention that the bonnet portion reduces the risk of injury to a pedestrian when impacted by the vehicle.

By the provision of a bonnet bumpstop which above a predetermined value representative of a force to be transmitted from a bonnet to the bonnet bumpstop is collapsible by substantially instantaneous neutralizing of the interconnection between a first component and a second component, a bonnet can move downwardly without or with reduced resistance from the bonnet bumpstop.

A bonnet bumpstop according to the invention can be used for achieving a pedestrian protection in an accident between a vehicle and a pedestrian. In particular, possibly head injuries of a child caused by a collision can be reduced.

According to a preferred embodiment of the invention, a bonnet bumpstop is formed with a first component having a support part for supporting the bonnet in the vertical direction during normal operation when the bonnet is closed and rests against the first component, a second component attachable to the vehicle, and an interconnection member operable to hold the first and second components to each other. When the bonnet transmits a force to the bonnet bumpstop above a predetermined value, the bonnet bumpstop is collapsible due to a substantially instantaneous neutralizing of the interconnection between the first and second components. As a result, a part of the first component, including the support part, will be moved substantially freely relative to the second component so as to allow the bonnet to move downwardly in case of an impact between a pedestrian and the bonnet.

It is yet another object of this invention to provide a bonnet bumpstop for an automotive vehicle that is arranged to yield during impact to allow the downward movement of the bonnet, and which is durable in construction, inexpensive of manufacture, carefree of maintenance, facile in assemblage, and simple and effective in use.

These and other objects, features and advantages are accomplished according to the instant invention by providing a bonnet bumpstop for use on an automotive vehicle is formed with a first component having a support part for supporting a bonnet on the vehicle in the vertical direction during normal operation when the bonnet is closed against the automotive frame, a second component attachable to the vehicle frame, and a member interconnecting the first and second components to each other. When the bonnet bumpstop incurs a force greater than a predetermined value, such as a force transmitted from a bonnet to the bonnet bumpstop, the bonnet bumpstop is collapsible by substantially instantaneous neutralizing of the interconnection between the first component and the second component. At least a part of the first component, including said support part, is then freed to be move relative to the second component so as to allow the bonnet to move downwardly in case of an impact between an object and the bonnet.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
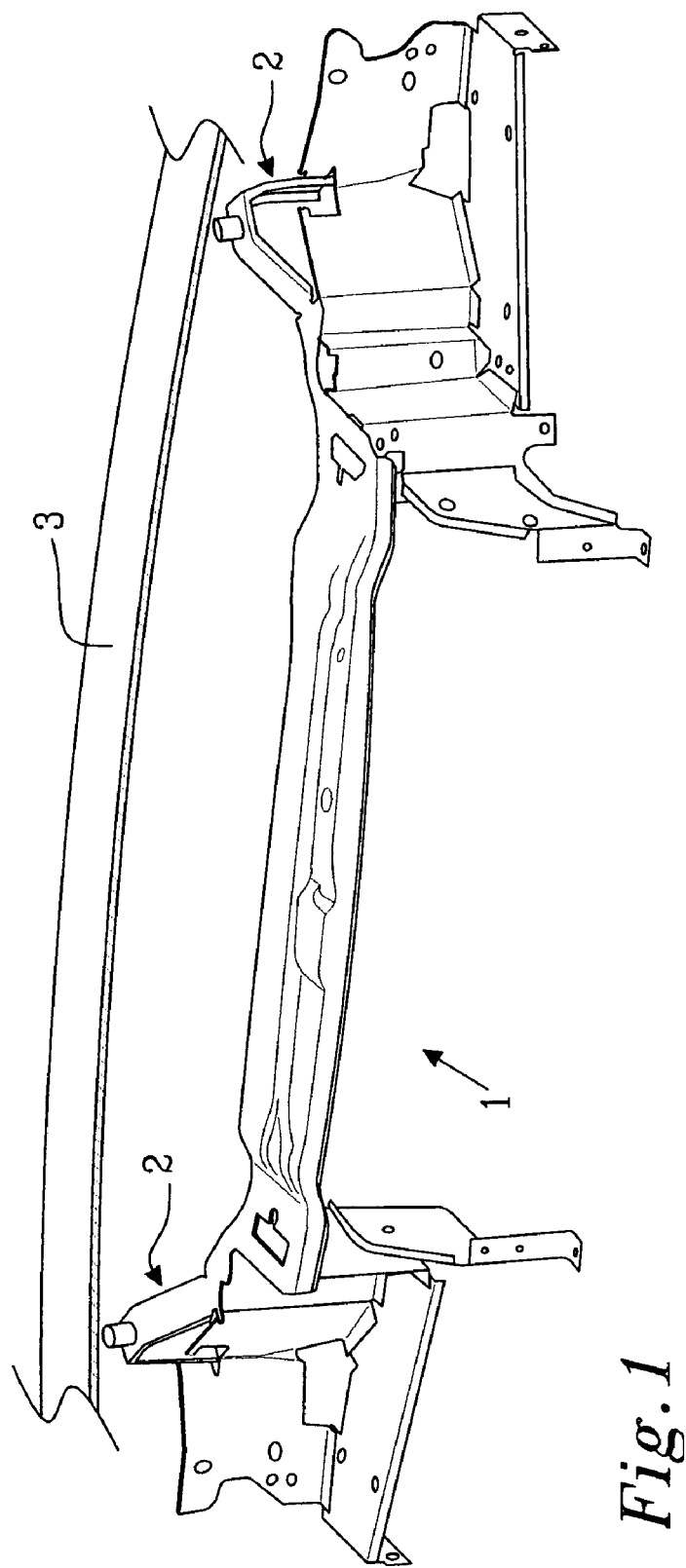
FIG. 1 is a perspective view showing a front cross member of an automotive vehicle provided with two bonnet bumpstops incorporating the principles of the instant invention.
Figure 2:
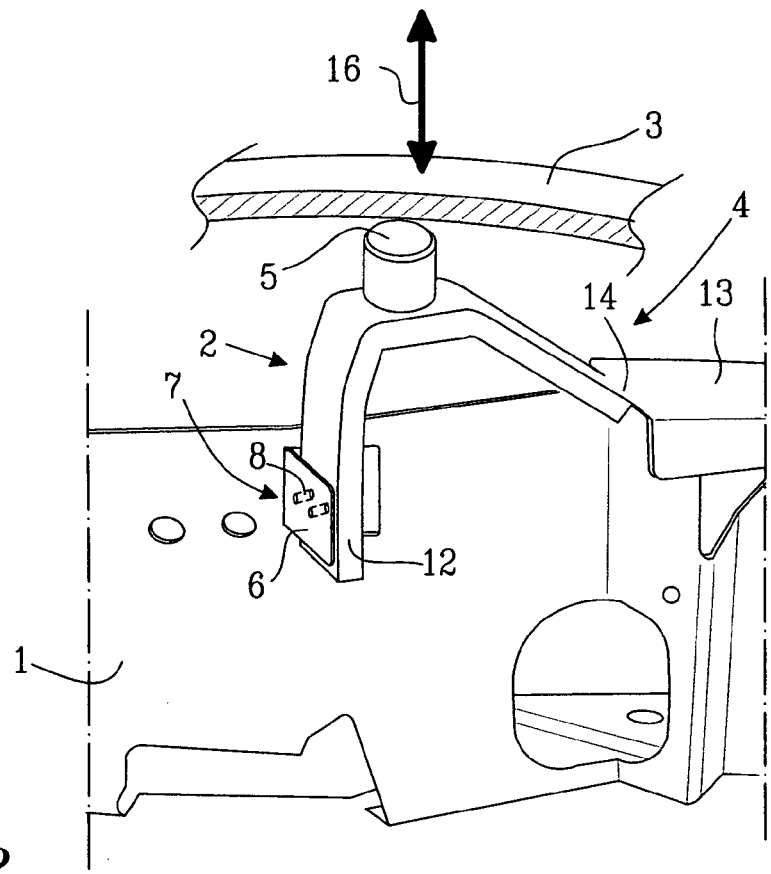
FIG. 2 is an enlarged perspective view of a bonnet bumpstop shown in FIG. 1 and depicting the bumpstop in a non-collapsed state during normal operative conditions.
Figure 3:
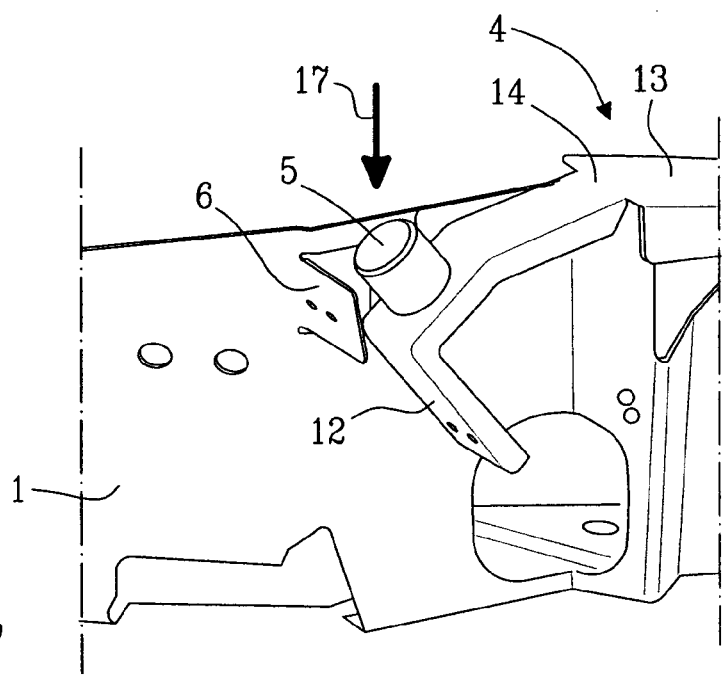
FIG. 3 is an enlarged perspective view corresponding to FIG. 2, but depicting the bonnet bumpstop in a collapsed state after impact.

As best seen in FIGS. 1-3, a bonnet bumpstop incorporating the principles of the instant invention is supported on the vehicle frame to provide a closure support for the bonnet of the automotive vehicle. FIG. 1 depicts a vehicle front cross member 1 (commonly referred to as the grille opening reinforcement of the vehicle) provided with two laterally spaced, collapsible bonnet bumpstops 2 formed according to the principles of the instant invention. Normally, the front cross member 1 is mounted in the front of a car to provide support for the attachment of several different components, for example a grille portion, head lamps etc. The bumpstops 2 are arranged to support a bonnet 3 and for alignment of the bonnet 3 relative the vehicle body when the bonnet 3 is closed. In a structure where two bonnet bumpstops 2 are used, they are preferably similar to each other and mounted in a mirror-inverted way relative to each other.

The bonnet bumpstop is illustrated more clearly in FIGS. 2 and 3. FIG. 2 shows the bonnet bumpstop 2 in a non-collapsed state during normal conditions, while FIG. 3 shows the bonnet bumpstop 2 in a collapsed state after an impact. The bonnet bumpstop 2 for a vehicle is formed with a first component 4 having a support part 5 for supporting a bonnet 3 in the vertical direction 16 during normal operation when the bonnet 3 is closed and rests against the first component 4. The supporting part 5 provides a certain limited area of the first component 4 where the bonnet 3 is intended to contact the bonnet bumpstop 2 when the bonnet 3 rests against the bonnet bumpstop 2. The supporting part is preferably constituted by a rubber-faced bumper 5 protruding upwardly from the first component 4. This bumper 5 preferably provides substantially a point support to the bonnet 3 during normal conditions.

The bonnet bumpstop 2 also comprises a second component 6 attachable to a vehicle. In the embodiment illustrated in FIGS. 1-3, the second component 6 is attached to a front cross member 1 which in turn is intended to be attached to a vehicle. This second component can be a plate 6 partly overlapping with the first component 4 so as to enable the first component 4 and the second component 6 to be interconnected to each other.

Figure 4:
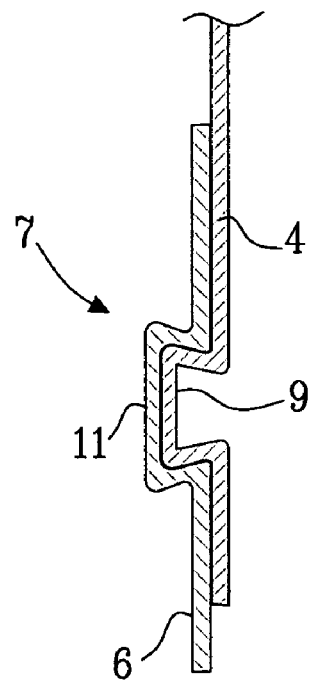
FIG. 4 is an enlarged partial cross-sectional view of a bonnet bumpstop illustrating a clinching joint as a first embodiment of the interconnection member between the first component and the second component of the bonnet bumpstop.

The bonnet bumpstop 2 further comprises an apparatus 7 for interconnection of the first component 4 and the second component 6 to each other. Such an interconnection apparatus 7 can be formed with an additional component 8 or be created by cooperation between the first and second components only, as can be seen in FIG. 4 described in greater detail below. Above a predetermined value representative of the force to be transmitted from a bonnet 3 to the bonnet bumpstop 2, the bonnet bumpstop 2 is collapsible by substantially instantaneous neutralizing of the interconnection between the first component 4 and the second component 6, thereby allowing at least a part of the first component 4 including the support part 5 to be moved substantially freely relative to the second component 6, which in turn allows the bonnet 3 to move downwardly 17 in the event of an impact between an object, including a pedestrian, and the bonnet 3. Accordingly, the bonnet bumpstop 2 is collapsible above a certain threshold value which can be selected so as to obtain desired various impact characteristics. Although such an interconnection apparatus 7 can be a breakable component 8 separate from the first and second components, such as a bolt, pin, rivet or similar, preferably such an interconnection means can be obtained by clinching the first component 4 and the second component 6 to each other.

As best seen in FIG. 4, a clinching joint is illustrated where a portion 9 of the material of the first component 4 protrudes and is arranged inside a corresponding protruding portion 11 of the second component 6. The shearing strength of the clinching joint determines the threshold value for breaking the interconnection between the first and second components. A clinching joint can be accomplished without use of any additional component, whereas a riveting joint for instance requires the use of a rivet. The interconnection apparatus 7 can be made breakable at the desired predetermined value in various ways for releasing the first and second components from each other. Preferably, the interconnection apparatus 7 is breakable by shearing which creates a non-ambiguous threshold value.

In addition to the various kinds of breakable interconnection means, in an alternative embodiment the interconnection between the first component and the second component can be neutralised by removal or retraction of the interconnection apparatus 7, as is further described in greater detail below with respect to FIG. 6.

Generally, the threshold value can correspond to a force in the interval 500 to 2500N exerted vertically on the bonnet bumpstop by the bonnet, and preferably in the interval 500 to 1500N, and more preferably in the interval 800 to 1200N. The use of such a threshold value for allowing neutralization of the interconnection between the first component 4 and the second component 6 also implies that below said predetermined value representative of the force to be transmitted from the bonnet 3 to the bonnet bumpstop 2, the first and second components are substantially immovable relative to each other because of the interconnection apparatus 7.

In the embodiment illustrated in FIGS. 2 and 3, the first component 4 has a first portion 12 interconnected to the second component 6 by means of said interconnection apparatus 7, and the support part 5 is included in the first portion 12. Furthermore, the first component 4 has a second portion 13 attachable to a vehicle. The first portion 12 and the second portion 13 are interconnected to each other by means of a weakened portion 14 constituting a weakening of the first component 4. As depicted in FIGS. 1-3, the second portion 13 is a part of the front cross member 1 which is intended to be mounted in a vehicle. The weakening portion 14 will permit pivoting of the first portion relative to the second portion of the first component 4 when the first portion 12 is loaded in excess of a predetermined value. This predetermined load value is adapted to the threshold value, and when the interconnection between the first and second component is neutralized, the first portion 12 of the first component 4 is pivoted around a geometrical pivot axis provided by the weakening portion 14 situated between said first and second portions 12, 13.

The first portion 12 is preferably an elongated arm 12 extending from the second portion 13 to the second component 6. The arm 12 may be provided with for example a notch at said weakening portion 14 between said first and second portions 12, 13 to obtain the weakening of the first component. Steel, aluminium and magnesium alloys are suitable materials for producing the first component 4 and/or the second component 6. Then, the first component 4 can be provided with such a weakening portion 14, and the interconnection between the first and second components 4, 6 can be accomplished by clinching in a rational way. Also plastics and hybrids of plastic and steel are possible materials that can be used.

Once the interconnection is neutralized, the type, position and size of the weakening of the first component 4 determines the critical load required to obtain pivot motion around the geometrical pivot axis, and thus the resistance against displacement of the bonnet 3 caused by the bumpstop 2 is determined by the stiffness of the weakening portion 14. The weakening portion 14 may be obtained by arranging a notch such as a slit, an incipient crack, a hack, a fold or flopper, and/or a material defect in the connection between the first portion 12 and the second portion 13. Thus, the size, geometry and/or the material properties of the first component can be used to achieve the requisite impact characteristics. The first component 12 has preferably a reduced cross section area at the weakening portion 14 in comparison to the adjacent parts of the first component 12.

Also embodiments where an additional component has to be broken to permit pivot motion around the pivot point can be used. In such embodiments, the weakening portion can be formed as a regular pivot point achieved by a hinge mechanism or similar device which pivot mechanism is locked against pivot motion by the additional component during normal operating conditions. By the provision of such an additional component, such as a shear pin or similar, a non-ambiguously defined threshold load needed to cause the pivot motion can be achieved.

Figure 5:
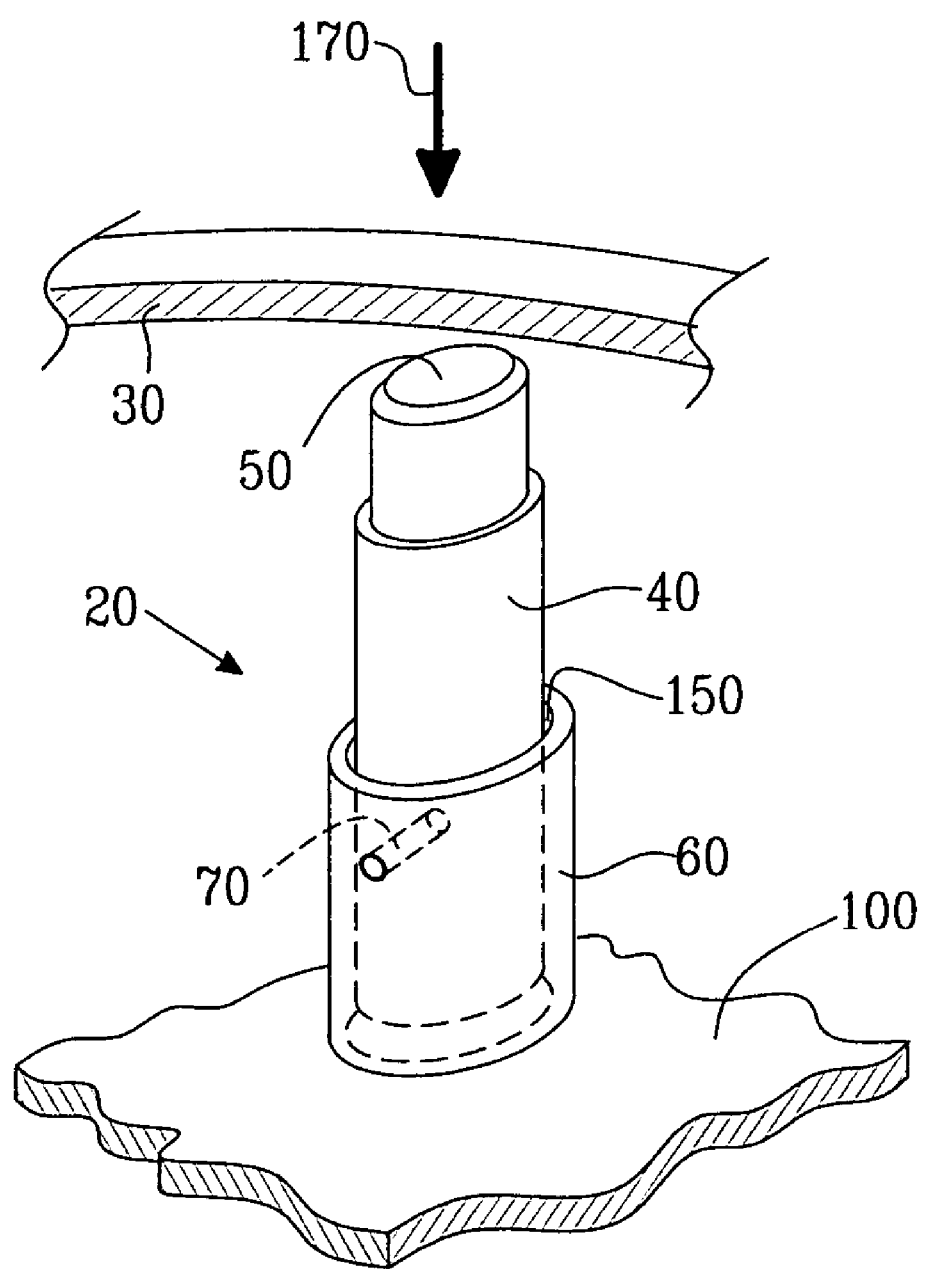
FIG. 5 is a schematic perspective view of a bonnet bumpstop assembly incorporating a pin as the interconnection member between the first and second components of the bonnet bumpstop similar to that of FIGS. 1-3.

Referring now to FIG. 5, an alternative embodiment of the bonnet bumpstop according to the principles of the instant invention is illustrated. In this embodiment, one of either the first component 40 or the second component 60 has a space 150 for accommodating at least a part of the other of the first component 40 and the second component 60. Preferably, the second component 60 accommodating the first component 40 is a tube which suitably can have a circular cross section. In the illustrated embodiment, the first component 40 is provided with the supporting part 50 and is arranged inside the second component 60. The first component 40 can be a solid cylinder or a tube concentrically arranged relative to the second component 60. The outer diameter of the first component 40 is less than the inner diameter of the second component 60. The second component 60 is attachable to the vehicle, for example to a front cross member 100 of the vehicle. The first component 40 is locked against movement relative to the second component 60 by means of the interconnection means 70. Once the interconnection between the first and second component 40, 60 is neutralized, either by breaking the interconnection member 70 or removal thereof, the first component 40 can move substantially freely relative to the second component 60. Preferably, the first component 40 is displaced downwardly due to the force, indicated by arrow 170, being exerted by the bonnet 30 during an impact situation.

To obtain a controlled movement between the first and second components 40, 60, any kind of spring element could be arranged between the first and second components to counteract the movement. The first and second components 40, 60 are preferably arranged so as to make the friction therebetween negligible. The interconnection member 70 can be of any type already mentioned hereinabove in connection with any other embodiment of the invention, such as for example one or more shearing pins.

Figure 6:
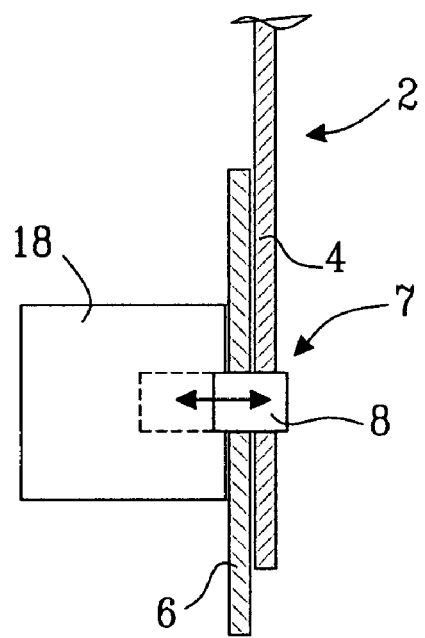
FIG. 6 is an enlarged partial cross-sectional view of an alternative embodiment of a bonnet bumpstop illustrating a displacement member operably interconnecting the first and second components of the bonnet bumpstop according to the principles of the instant invention.

FIG. 6 illustrates schematically a bonnet bumpstop assembly comprising a bonnet bumpstop 2 (only partly illustrated) according to the invention, for example a bonnet bumpstop as illustrated in FIG. 2 or 5, and a mechanism 18 for displacement of the interconnection member 7, which can be a pin 8, for releasing the first component 4 and the second component 6 from each other. Thus, in this embodiment the interconnection member 7 is not broken at a predetermined threshold value. Instead the interconnection member 7 is displaced for removal of the interconnection member 7 and thereby neutralizing the interconnection between the first and second components 4, 6. The displacement mechanism 18 can be an electric motor provided with suitable components for converting rotation movement of the motor to a linear motion of the interconnection member 7. Alternatively, the displacement mechanism 18 can be an electromagnet for displacement of the interconnection member 7. In the position illustrated, the pin 8 locks the first component 4 and the second component 6 relative to each other. By displacement of the pin 8 in a direction to the left in FIG. 6 to a position illustrated by the dashed lines, the interconnection between the first component 4 and the second component 6 is neutralized.

The displacement mechanism 18 is preferably controlled to remove the interconnection member 7 so as to provide substantially the same impact characteristics as if the interconnection member 7 was broken. This implies that the interconnection member 7 is displaced in a situation where a force exceeding the predetermined value can be expected to be transmitted.

Control the displacement mechanism 18 can be attained in at least two alternative manners. As a first main alternative, a sensor can be arranged on the vehicle and used to control the displacement mechanism 18. The sensor (not shown) can be of the type sensing the position, size and/or relative speed of an object which is to impact the bumper or the bonnet of a vehicle. This kind of sensor can utilize, for example, radar or any similar equipment. Another type of sensor can be arranged to sense the force exerted on the vehicle by an object during the initial part of a collision between such an object and the vehicle.

The second main alternative for control of the displacement mechanism 18 is to control the operation of the displacement mechanism 18 based on the speed of the vehicle. For example, during velocities between 20-45 km/h, the displacement mechanism 18 is controlled to remove the interconnection member 7 so as to neutralize the interconnection between the first and the second component 4, 6. Of course, these main control alternatives can be combined with each other.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A bonnet bumpstop for an automotive vehicle, comprising:
    a first component having a support part for supporting a bonnet in the vertical direction during normal operation of said bonnet bumpstop when the bonnet is closed and rests against the first component;
    a second component mounted on said vehicle; and
    an interconnection apparatus for interconnection of the first and second components to each other, said interconnection apparatus being operable to prevent movement of said first component relative to said second component unless subjected to a force greater than a predetermined value transmitted from said bonnet to said bonnet bumpstop, the bonnet bumpstop being collapsible due to a substantially instantaneous neutralization of the interconnection apparatus between the first component and the second component, thereby allowing at least a part of the first component including said support part to be moved substantially freely relative to the second component so as to allow the bonnet to move downwardly in case of an impact between an object and the bonnet, said first component having a first portion connected to said second component and a second portion attachable to said vehicle, the first and second portions being interconnected by a weakened portion in said first component to allow a pivoting movement of said first portion relative to said second portion when said first portion is loaded in excess of said predetermined value.

2. The bonnet bumpstop of claim 1 wherein said first portion is interconnected to said second component by means of said interconnection apparatus, said support part being included in the first portion.

3. The bonnet bumpstop of claim 2 wherein the first portion is formed as an elongated arm extending from the second portion to the second component, said elongated arm being provided with a notch at said weakened portion between said first and second portions to obtain the weakening of the first component.

4. The bonnet bumpstop of claim 2 wherein said interconnection apparatus is breakable when encountering a force greater than said predetermined value for releasing the first component for movement relative to said second component.

5. The bonnet bumpstop of claim 4 wherein the interconnection apparatus is formed as a shear member operable to break by shearing.

6. The bonnet bumpstop of claim 4 wherein the interconnection apparatus is a clinching joint between the first component and the second component.

7. The bonnet bumpstop of claim 4 wherein the interconnection apparatus is displacement mechanism having an actuator operable to displace a pin interconnecting said first and second components, said actuator being operable to retract said pin from said first component so as to neutralize the interconnection between the first and second components for releasing the first component from the second component.

8. In a bonnet bumpstop for use on an automotive vehicle having a frame, said bumpstop including a support member for engaging said bonnet when said bonnet is closed into an operative position against said frame, the improvement comprising:
    a first member supporting said support member for engagement with said bonnet;
    a second member mounted on said frame proximate to said first member, said first member being formed as an elongated arm extending from the second member to said vehicle frame, said elongated arm having a first portion on which said support member is mounted and a second portion, said first portion being secured against said second member during normal operative conditions, said second portion extending between said first portion and said vehicle frame; and
    a breakaway mechanism interconnecting said first and second members to positionally fix said first member relative to said second member during normal operation thereof, said breakaway mechanism being operable when incurring a force greater than a predetermined value to permit said first member to move relative to said second member so that said bonnet can deform downwardly as a result of an impact thereof with an object.

9. The bonnet bumpstop of claim 8 wherein said breakaway mechanism is formed as a clinching joint between said first and second members.

10. The bonnet bumpstop of claim 8 wherein said breakaway mechanism is formed with a pin interconnecting said first and second members.

11. The bonnet bumpstop of claim 10 wherein said pin is shearable when encountering a shearing force greater than said predetermined value to permit said first member to be released for movement relative to said second member.

12. The bonnet bumpstop of claim 10 wherein said pin is connected to an actuator that retracts said pin from engagement with both said first and second members to release said first member for movement relative to said second member when said support member encounters a force greater than said predetermined value.

13. The bonnet bumpstop of claim 8 wherein a weakened portion is formed between said first portion and said second portion, said weakened portion permitting said first portion to pivot relative to said second portion when said first member is released for movement relative to said second member.

14. A bonnet bumpstop assembly for deployment on an automotive vehicle frame having a bonnet mounted thereon for movement into a closed operative position, comprising;

a first member having mounted thereon a support member for engagement with said bonnet, said first member having a weakened portion to permit said first member to be movable about said weakened portion in response to an application of a force greater than a predetermined value being exerted thereon;

a breakaway apparatus operably connected to said first member to restrain said first member in an operative position until said force greater than a predetermined value is applied to said first member in which case said breakaway apparatus is operable to release said first member for movement about said weakened portion: and a second member supported on said vehicle frame adjacent said first member, said breakaway apparatus being mounted on said second member and including a pin engagable with said first member to fix said first member into said operative position, said breakaway apparatus including an actuator operable to retract said pin from engagement with said first member to release said first member for movement about said weakened portion when said force greater than a predetermined value is encountered for said first member.

* * * * *